United States Patent [19]

Umeda

[11] Patent Number: 5,145,128
[45] Date of Patent: Sep. 8, 1992

[54] STORAGE DEVICE AND METHOD FOR STORING VIDEO MONITORING EQUIPMENT FOR AIRLINER

[75] Inventor: Katsuhiko Umeda, Mitaka, Japan

[73] Assignee: Jamco Corporation, Tokyo, Japan

[21] Appl. No.: 751,886

[22] Filed: Aug. 29, 1991

[30] Foreign Application Priority Data

Aug. 31, 1990 [JP] Japan .................. 2-228379

[51] Int. Cl.⁵ .......................................... B64D 11/00
[52] U.S. Cl. .................. 244/118.5; 248/918
[58] Field of Search ............... 244/118.5, 129.1, 1 R, 244/118.6; 248/917, 918; 60/527, 528; 312/7.2; 267/154, 182

[56] References Cited

U.S. PATENT DOCUMENTS

| | | |
|---|---|---|
| 2,413,922 | 1/1947 | Jensen et al. ............ 312/7.2 |
| 2,787,118 | 4/1957 | Markham ................ 60/528 |
| 3,370,813 | 2/1968 | Albertine et al. ......... 244/118.5 |
| 4,046,437 | 9/1977 | Caron et al. ............ 312/7.2 |
| 4,843,782 | 12/1989 | Gustaveson et al. ...... 312/7.2 |
| 4,884,780 | 12/1989 | Ohashi ................. 60/528 |
| 5,035,530 | 7/1991 | Fukuda et al. .......... 60/527 |

OTHER PUBLICATIONS

NASA CP-001, "Proceedings of the Scar Conference", Mar. 3, 1977.

*Primary Examiner*—Sherman D. Basinger
*Assistant Examiner*—Virna Lissi Mojica
*Attorney, Agent, or Firm*—Armstrong, Nikaido, Marmelstein, Kubovcik & Murray

[57] ABSTRACT

A storage section for storing a video monitoring equipment for an airliner and the video monitoring equipment which moves to a visible position are connected by two long cylindrical springs. One of the springs is urged in the direction of the storage section of the airframe. The other spring is made of a shape-memory alloy on which a specific shape is memorized in heated condition. When the second spring is heated and takes the specific shape, the video monitoring equipment is moved to the visible position together with the move of the second spring going against the urging force of the first spring. When the heating of the second spring is stopped, the video monitoring equipment is moved to the storage section along with the movement of the first spring by the urging force of the first spring.

14 Claims, 5 Drawing Sheets

STORAGE DEVICE AND METHOD FOR STORING VIDEO MONITORING EQUIPMENT FOR AIRLINER

BACKGROUND OF THE INVENTION

1. Field of the Invention

The present invention relates to a storage device and a method for storing a video monitoring equipment provided in an airliner, and more particularly to the storage device and the method for storing the equipment in a ceiling or a storage box of a body of the plane.

2. Description of the Prior Art

The explanation on how to handle emergency equipment which are provided in a plane was done by stewardesses standing in front of passengers, but some passengers could not see the stewardess well because of the position of their seats. Moreover, when a movie was played, the inside of the plane was divided into two to three parts and a screen was lowered at the forefront of each part to project the movie on the screen, but again, some passengers could not see the screen well because of the position of their seats.

So recently, an attempt has been made to eliminate such an inconvenience by installing many video monitoring equipment using a storage box on a ceiling or above the seats, each of which is aimed to show movies and video tapes on the explanation of the handling methods of the equipment to only few passengers.

However, those video monitoring equipments installed on the ceiling or the storage box have to be stored in storage sections such as inside of the ceiling or the storage box for safety reasons when they are not used. The storage is carried out by an integrated control system which is operated by the crewmen in charge of the passenger seats, but this device has such disadvantages that it requires a driving device for moving the video monitoring equipments in and out and that it is complex and causes many troubles.

SUMMARY OF THE INVENTION

The object of the present invention is to solve the aforementioned disadvantages by providing a storage device and a method for storing a video monitoring equipment installed inside an airliner, having a simple structure, being less troublesome being much safer.

The storage system for storing the video monitoring equipment for airliner of the present invention is comprised of:

a first spring 22 whose one end is fixed to the airframe side and the other end is fixed to the video monitor side between the storage section of the airframe and the video monitoring equipment, the first spring 22 being a long cylindrical spring and being urged in the direction of the airframe side;

a second spring made of a shape-memory alloy which returns to a specific memorized shape when it is heated, one end of the second spring being fixed to the airframe and the other end being fixed to the video monitoring equipment;

a means to move the video monitoring equipment to a visible position by making the second spring return to the memorized shape by heating thereof; and a means to move the video monitoring equipment to the storage section of the airframe by stopping the heating of second spring and using the urging force of the first spring.

Furthermore, the method for storing the video monitoring equipment for an airliner uses two springs that connect the airframe and the video monitoring equipment, the first spring 22 being urged in the direction of contraction and the second spring being made of a shape-memory alloy on which a specific shape has been memorized and returns to the memorized shape when it is heated. The video monitoring equipment is disposed so that it becomes visible when the second spring is caused to have a specific shape, and is stored when the first spring 22 is contracted. At the same time when electric power is fed for heating the second spring to move the video monitoring equipment to a visible position, the video monitoring equipment starts to operate. When electric power is turned off, the video monitoring equipment stops to operate, and the urging force of the spring moves the video monitoring equipment to the storing position. When the video monitoring equipment is switched on to start its operation and to feed electric power to the second spring, due to a heat generated by a resistance of the spring against the electric power, the second spring returns to its memorized shape, thereby causing the video monitoring equipment to be brought down to the visible position. And when the video monitoring equipment is switched off and the power is turned off, it terminates its operation and is stored in the storage section moved by the urging force of the first spring.

BRIEF DESCRIPTION OF THE DRAWINGS

The preferred embodiments of the present invention will be described in reference to the drawings wherein.

DETAILED DESCRIPTION OF THE PREFERRED EMBODIMENTS

Embodiments of the present invention will now be described in detail with reference to the drawings.

Figure 1:
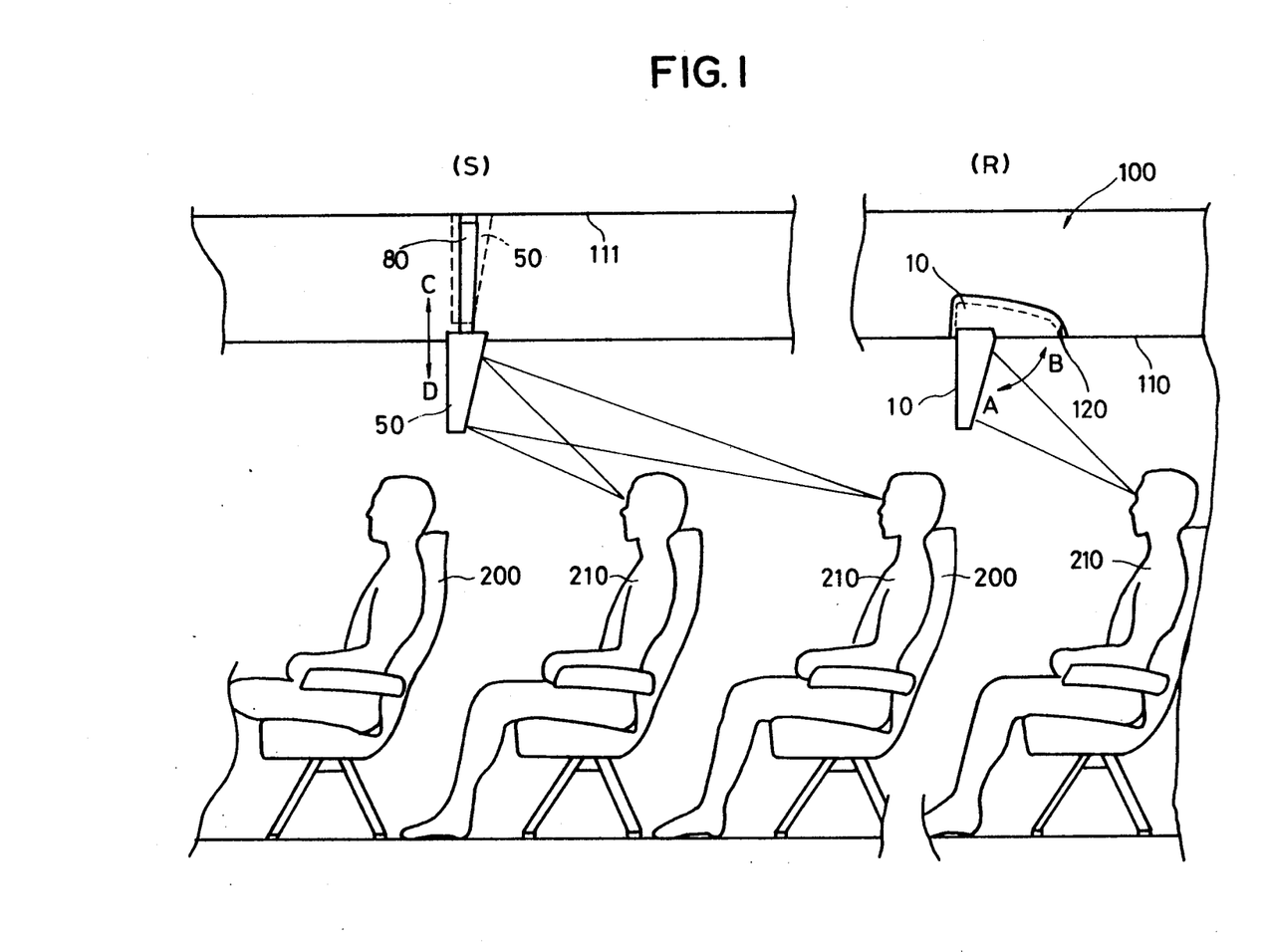
FIG. 1 is a schematic drawing illustrating a state when storage systems of the present invention are used.

FIG. 1 is an explanatory drawing showing the case when a storage system is used by being mounted to a bottom plate of a storage box 100 mounted above seats 200 inside a plane. Two storage systems are shown here. One system is a turnable storage system (shown by symbol R in FIG. 1) whereby a video monitoring equipment lowered below the storage box 100 is stored in a storage section 120 provided in a bottom plate 110 of the storage box 100 by turning a casing 10 in which the video monitoring equipment is packaged in the direction of B, and the other system is a sliding storage system (shown by symbol S in FIG. 1) whereby a video monitoring equipment 50 used by lowering below the storage box 100 is stored in the storage box 100 by sliding the video monitoring equipment 50 in the direction of C.

The First Preferred Embodiment

In this section, the rotating storage device and the rotating method for storing the video monitoring equipment shown by symbol R in FIG. 1 will be explained.

Figure 2:
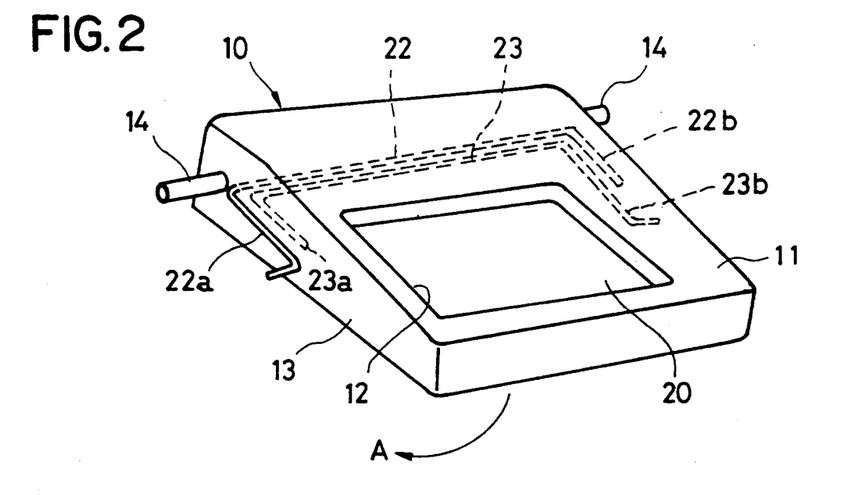
FIG. 2 is a perspective view illustrating a state when a turnable storage system is stored.

FIG. 2 is a perspective view illustrating the storage device for storing a video monitoring equipment for an airliner according to the first preferred embodiment.

A video monitor equipment 20 using a liquid crystal screen is stored in a box type casing 10 and the screen can be seen from a window hole 12 opened on a front wall 11. Anchored to the casing 10 on the upper part of both side walls 13 of the front wall 11 is a cylindrical mounting shaft 14 extruding outwardly in the both sides. The casing 10 within which the video monitor equipment is stored in a manner the lower end portion of the video monitor equipment is matched to the lower end portion of the casing 10 is mounted turnably to the ceiling of the airframe or the bottom of the storage box by inserting the mounting shaft 14 to a mounting hole created on the ceiling walls of the airframe or on the walls of the storage box.

Two long cylindrical springs (a first spring 22 and a second spring 23) are disposed in parallel within the casing 10 at the upper portion of the video monitor equipment 20 and at the side of the mounting shaft 14.

The first spring 22 is in a long cylindrical shape, and the both ends are bent in a right angle and the one bent portion represents an airframe anchoring portion 22a and the other bent portion represents a casing anchoring portion 22b. The airframe anchoring portion 22a is extruded out of the side face 13 of the casing 10 and is fixed to a ceiling plate or a wall of the storage box of the airframe where the video monitor is disposed. The other casing anchoring portion 22b is fixed to the inner wall surface of the side 13 which fixes the mounting shaft 14 to the outside wall of the casing 10. The first spring 22 is urged so that the airframe anchoring portion 22a and the casing anchoring portion 22b, the bent portions of the first spring 22, hold a same plane.

The casing 10 is mounted by inserting the mounting shaft 14 of the casing 10 in which the video monitoring equipment is packaged to the mounting hole in the ceiling wall of the airframe or the storage box wall and by fixing the airframe anchoring portion 22a of the first spring 22 to the wall of the airframe. The casing 10 is then stored along the mounting wall surface of the airframe anchoring portion 22a by the urging force of the casing anchoring portion 22b of the first spring 22 as shown by a dot line in FIG. 1.

The second spring 23 is a long cylindrical spring made of a shape-memory alloy that causes martensite transformation. The both ends of the second spring 23 are bent in a right angle and one bent portion represents an airframe fixing portion 23b and the other bent portion represents a casing fixing portion 23a.

The casing fixing portion 23a, which is one of the bent ends of the second spring 23, is disposed in the airframe anchoring portion 22a side of the first spring 22 and is anchored to the inner wall face of the side wall 13 on the side where the mounting shaft 14 is disposed in the casing 10. The other end, airframe fixing portion 23b, is disposed in the side of casing anchoring portion 22b of the first spring 22 and is extruded out of the side wall 13 of the casing 10 to fix to the ceiling plate or the wall of the storage box of the airframe where the video monitor is disposed. The second spring 23 is connected to a same power source for the nearest video monitor equipment 20. The casing fixing portion 23a of the second spring 23 is memorized a shape wherein it is turned 90° in a plane perpendicular to the longitudinal direction of the second spring 23 when the power is supplied to heat it up. The casing fixing portion 23a is structured so that it recovers to the memorized shape with strong force when the power is supplied to heat the second spring 23.

The storage device of the video monitoring equipment structured as described above is stored for example in the storage section 120 of the bottom plate 110 of the casing storage box 100 disposed above the passengers' seats by urging force of the first spring 22 in a state shown by the dot line and by the symbol R in FIG. 1.

Figure 3:
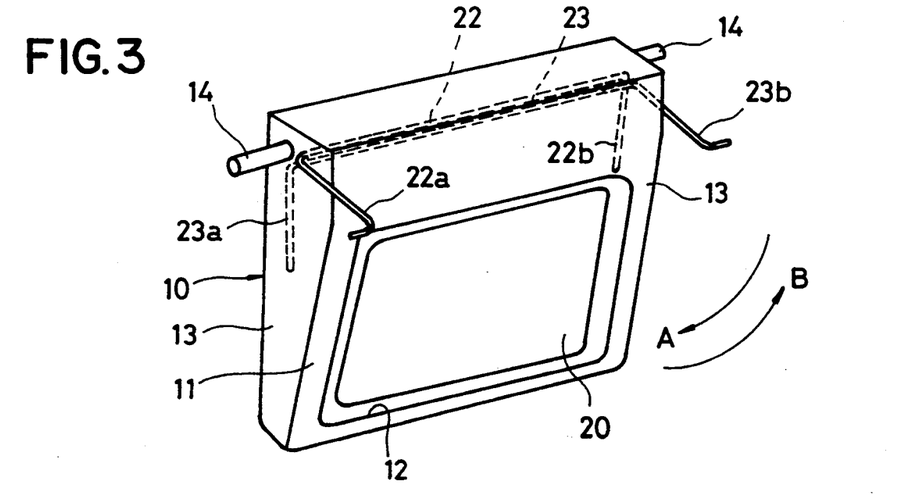
FIG. 3 is a perspective view illustrating a state when the turnable storage system is turned.

When the video monitoring equipment 20 is to be used, the switch is turned on to start its operation. At the same time the power is supplied to the casing fixing portion 23a of the second spring 23 to heat it up, and the casing fixing portion 23a returns with strong force to the memorized shape which is turned 90° in the plane perpendicular to the second spring 23 and which has been memorized in a heated condition. Along with the turn of the casing fixing portion 23a, the casing 10 on which the casing fixing portion 23a is fixed turns in the direction of an arrow A pivoting on the mounting shaft 14 against the urging force of the first spring 22 and drops below the bottom plate 110 of the casing storage box 100 in an operating condition with the video on to a position where video can be seen from the passenger 210. (See FIG. 3)

Figure 4:
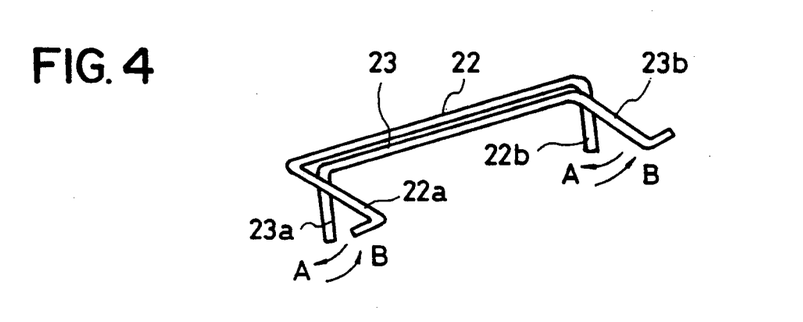
FIG. 4 is a perspective view explaining a first and a seocnd springs.

The relationship between the position of the first spring 22 and the second spring 23 within the storage device at this state is shown in FIG. 4. The airframe fixing portion 22a and 23b of the first spring 22 and the second spring 23 cannot move since they are fixed to the airframe. Contrary to that, as for the casing anchoring portion 22b and 23a, the second spring 23 turns by the returning force of the casing fixing portion 23a since the force of the casing fixing portion 23a of the second spring 23 returning to the memorized shape is greater than the urging force of the casing anchoring portion 22b of the first spring 22. Then the second spring 23 turns the casing 10 to which the casing fixing portion 23a is fixed and the casing anchoring portion 22b of the first spring 22 also turns against the urging force together with the casing 10 to the position where it is turned 90° from the airframe anchoring portion 22a.

When the video monitoring equipment becomes unnecessary to watch, the power is switched off and the power supply to the video monitoring equipment and the second spring 23 is halted. Since the generation of heat due to the resistance of the second spring 23 is stopped at the same time when the operation of the video monitoring equipment is stopped, the second spring 23 cools down and the urging force of the casing anchoring portion 22b of the first spring 22 fixed to the side wall 13 of the casing 10 to return to the same plane as the airframe anchoring porion 22a becomes greater. Then the casing anchoring portion 22a of the first spring 22 turns together with the casing 10. The casing 10 turns to the direction of the bottom face of the storage box 100 (in the direction of arrow B) pivoting on the mounting shaft 14 and is stored in a state engaging with the storage section 120 of the storage box 100.

The video monitor equipment 20 in the present embodiment is freely moved to the operating position by turning the light weight liquid crystal video monitoring equipment utilizing the restoring force of the second spring 23 made of a shape-memory alloy and can also be freely moved to the storage position utilizing the urging force of the first spring 22. It is appreciated that this storage device and storing method cause the video monitoring equipment 20 to be moved to the operating position and to the storage position just by switching power to the video monitoring equipment 20 on and off, and moreover, it doesn't require any special driving force for storing and moving the video monitor equipment, so the device has a simple structure and has less trouble. Also, the device can be mounted to the airframe just by inserting the mounting shaft 14 to the mounting holes, so that it can be used generally. Furthermore, this device is very safe since, when the electrical system happens to fail, the video monitoring equipment is turned in the direction for storage at the same time when the operation of the video monitoring equipment is stopped.

The Second Preferred Embodiment

A storage device and a method for storing a sliding video monitoring equipment shown by symbol S in FIG. 1 will be explained in this preferred embodiment.

Figure 5:
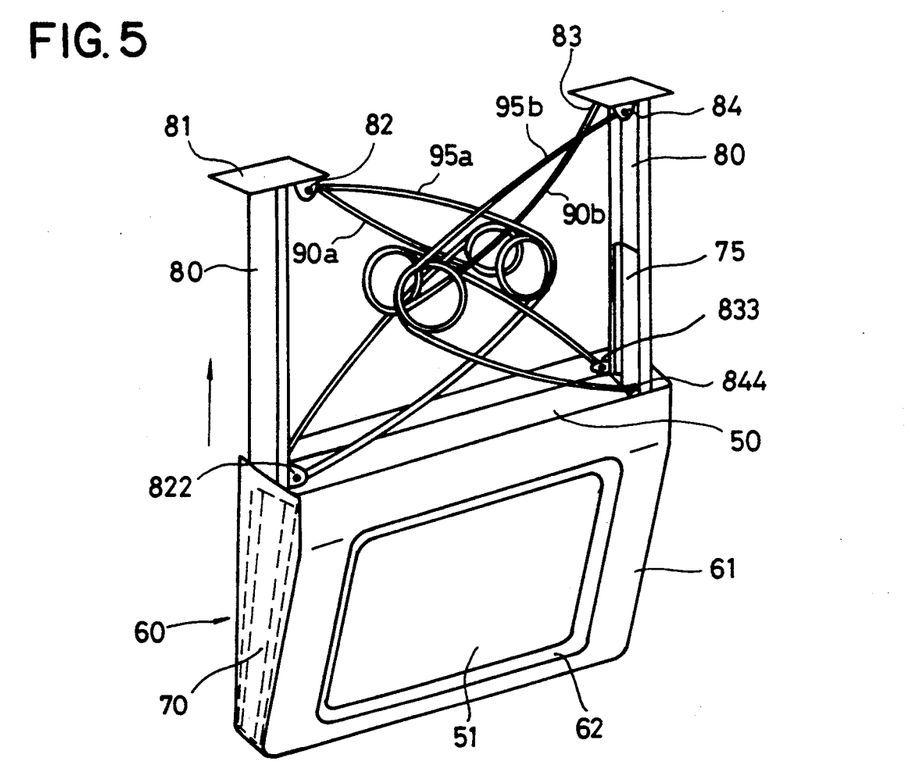
FIG. 5 is a perspective view illustrating a sliding storage system.

FIG. 5 is a perspective view illustrating the storage device of the video monitoring equipment for an airliner in the present embodiment.

A video monitoring equipment 50 using liquid crystal is stored within a box type casing 60 whose upper face is open and a video screen 51 appears from a window 62 opened on a front wall 61 of the casing 60. The casing 60 and the video monitoring equipment 50 are fixed at their lower end surface and are structured so that the width of the front wall 61 of the casing 60 is larger than the width of the front wall of the video monitoring equipment 50 to create a gap between the side walls of the casing 60 and the video monitoring equipment 50 when the video monitoring equipment 50 is packaged in the casing 60. A moving rail 70 is anchored to the outside face of the side wall of the video monitoring equipment 50.

On the other hand, a hole for passing the casing 60 is created on the bottom plate 110 of the storage box 100 above the seats where the video monitoring equipment is stored and fixed rails 80 are mounted in the both ends of the hole between an upper face 111 and the bottom plate 110 of the storage box 100. The fixed rail 80 are structured so that a pair of rails face each other. The upper end portion of the fixed rail 80 is fixed to the upper face 111 of the storage box 100 by a fixing plate 81. Moreover, the fixed rails 80 are inserted to the gap between the video monitoring equipment 50 and the casing 60 and the lower end portion of the fixed rail 80 protruded out of the lower end surface of the casing 60 is anchored to the bottom plate 110 of the storage box 100. Thus the casing 60 in which the video monitoring equipment 50 is packaged is mounted slidably between the upper and lower ends of the fixed rails 80.

Figure 7:
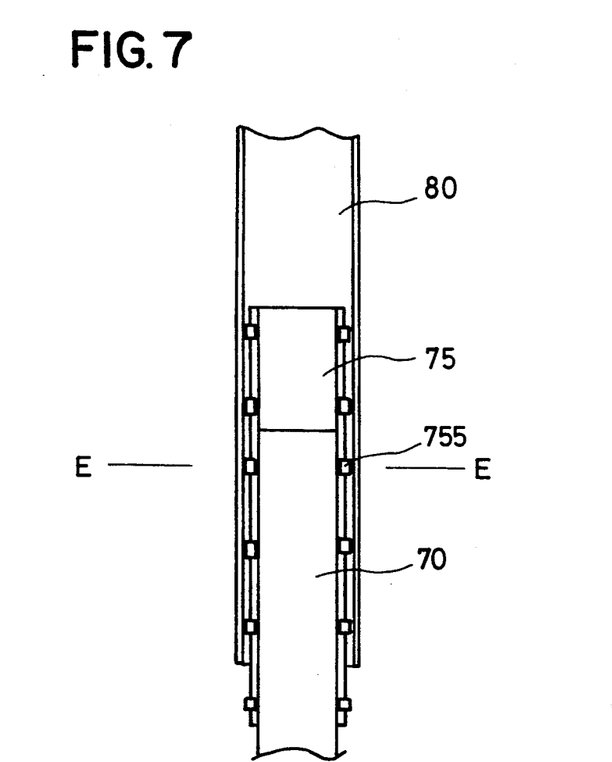
FIG. 7 is a plan view showing a sliding mechanism of a fixed rail and moving rail.
Figure 8:
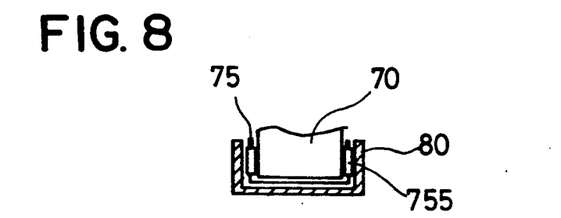
FIG. 8 is a sectional view taken along a line E—E in FIG. 7.

Next, a mechanism for moving the casing 60 up and down against the fixed rails 80 is described in reference to FIGS. 7 and 8. A thinner moving rail 70 of the video monitoring equipment 50 is inserted to a rail channel of the fixed rail 80 through the intermediary of an intermediate retainer 75 having bearings 755. The moving rail 70 of the video monitoring equipment 50 is guided by the fixed rail 80 and smoothly moves up and down by the rolling action of the bearings 755 of the intermediate retainer 75.

By being guided by the fixed rail 80 installed in the storage box 100, the video monitoring equipment 50 on which the moving rail 70 is anchored thus lowers from a state in which the casing 60 is moved to the upper end of the fixed rail 80 and is stored in the storage box 100 to a state in which the casing 60 is moved to the lower end of the fixed rail 80 and to a state in which the casing 60 is hanged from the bottom plate 110 of the storage box 100.

Furthermore, two first springs 90a and 90b and two second springs 95a and 95b are stretched above the video monitoring equipment 50 and between the fixed rails 80.

Figure 6:
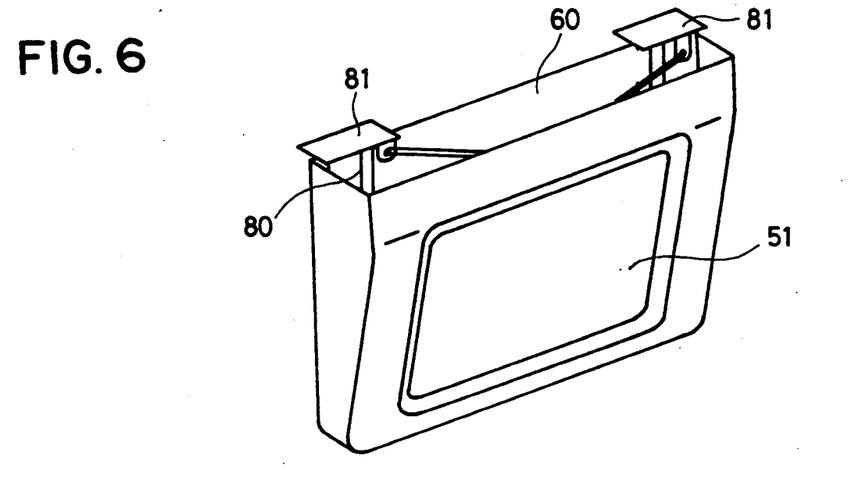
FIG. 6 is a perspective view illustrating a state when the sliding storage system is stored.
Figure 9:
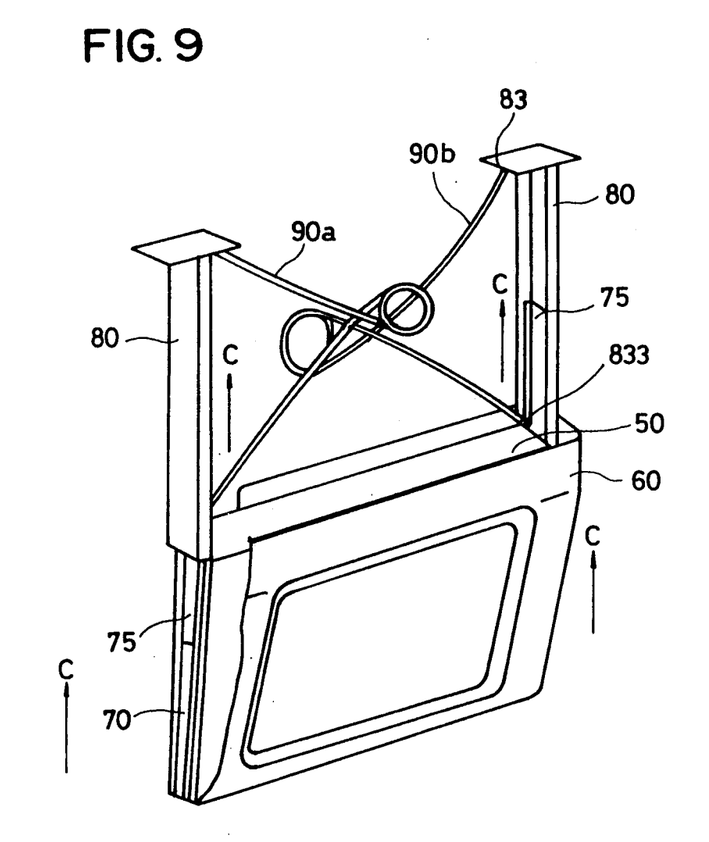
FIG. 9 is a perspective view, with a portion of a casing broken away to reveal an operation of the first spring.

Referring now to FIG. 9, the mounting of the first springs 90a and 90b and their effect is explained. The first springs 90a and 90b are long cylindrical springs whose center portion is turned to make a circle and the both ends of the first springs 90a and 90b are opened so that the circle faces toward the outside. One end of the one first spring 90a is fixed to a mounting section (not shown) at the upper end of one fixed rail 80 and the other end is fixed to a mounting section (not shown) at the upper end of the moving rail 70 of the video monitoring equipment 50 which is inserted to the fixed rail 80. The other first spring 90b is fixed, similarly to the first spring 90a, to a mounting section 83 at the upper end of the other fixed rail 80 which faces to the fixed rail 80 on which the first spring 90a is fixed and to a mounting section 833 at the upper end of the moving rail 70 which is fixed to the video monitoring equipment 50. Then triangles are made respectively by the bent first spring 90a and one fixed rail 80 and by the bent first spring 90b and the other fixed rail 80 with a vertex of the circle at the center portion of the springs and a base of the fixed rail 80. The first springs 90a and 90b are urged in the direction of contracting the both ends fixed to the upper portion of the fixed rail 80 and the upper end of the moving rail 70. Accordingly as shown in FIG. 9, the first springs 90a and 90b move the lower end which is movable against the fixed upper end in the direction of arrow C which is the upward direction by the urging force of the springs. Along with the upper movement, the moving rail 70 of the video monitoring equipment 50 fixed to the lower end of the first springs 90a and 90b is lifted up. By being guided by the fixed rail 80 through the rolling effect of the intermediate retainer 75, the moving rail 70 smoothly elevates in the direction of arrow C which is the upward direction and stops when the casing 60 hits a mounting plate 81 of the fixed rail 80. The casing 60 in which the video monitoring equipment 50 is packaged is then stored between the fixed rail 80 in a state shown in FIG. 6.

Figure 10:
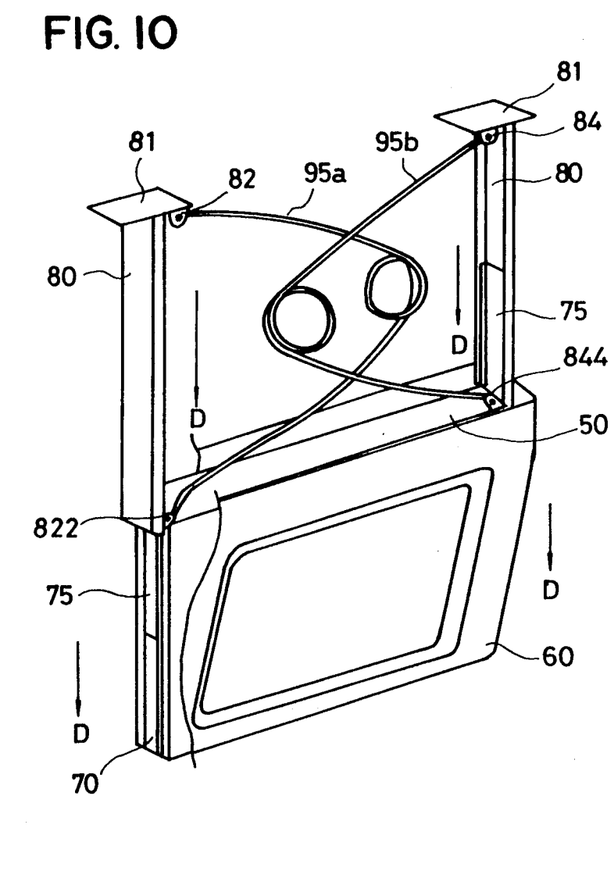
FIG. 10 is a perspective view, with a portion of a casing broken away to reveal an operation of the second spring.

The mounting of the second springs 95a and 95b and their effect is explained in reference to FIG. 10. The second springs 95a and 95b are long cylindrical springs made of a shape-memory alloy causing martensite transformation. The center portion of the long cylindrical springs is turned to form a circle and a shape in which the both ends of the second springs 95a and 95b are opened equally to the length of the fixed rail 80 when the springs are heated is memorized on the springs. One end of one second spring 95a is fixed to the mounting section 82 at the upper end of the fixed rail 80 and the other end is fixed to the mounting section 822 at the upper end of the moving rail 70 fixed to the video monitoring equipment 50 and which is inserted to the fixed rail 80. The other second spring 95b is fixed, similarly to the second spring 95a, to a mounting section 84 at the upper end of the fixed rail 80 which faces to the other fixed rail 80 on which the second spring 95a is fixed and to a fixing portion 844 at the upper end of the moving rail 70 fixed to the video monitoring equipment 50. Then an approximate triangle is made respectively by one fixed rail 80 and the bent second spring 95a and the other fixed rail 80 and the bent second spring 95b with a vertex of the circle at the center portion and a base of respective fixed rail 80. The video monitoring equipment 50 and the second springs 95a and 95b are connected to a same power source.

The second springs 95a and 95b has memorized a shape in which the both ends thereof are opened when heated, so that when electric power is fed to the video monitoring equipment 50 and to the second spring 95 to heat it up, the second springs 95a and 95b open the both ends thereof by a strong force in trying to return to the memorized shape. However, the upper end of the second spring 95b is fixed, so the lower end moves in the direction of arrow D which is the downward direction.

The storage device of the video monitoring equipment 50 as structured above is stored, for example, in the storage box 100 disposed above the passengers' seats by the urging force of the first springs 90a and 90b as shown by symbol S and a dot line in FIG. 1.

At the same time when the electric power is switched on to operate the video monitoring equipment 50, the second springs 95a and 95b are heated up due to the resistance thereof and open their end portions by strong force in trying to return to the memorized shape. Along with the opening operation of the second springs 95a and 95b, the moving rail 70 which has been lifted up to the upper end of the fixed rail 80 by the urging force of the first springs 90a and 90b is guided by the fixed rail 80 together with the video monitoring equipment 50 and slides down in the direction of arrow D by the rolling effect of the intermediate retainer 75.

The moving rail 70 drops down until the upper end of the casing 60 matches the bottom plate 110 of the storage box 100. Then the video screen 51 which has started showing a video protrudes out of the bottom of the box and the video monitoring equipment 50 is set in the position visible for the passengers 219 as shown by solid line in FIG. 1.

The storage device of the video monitoring equipment 50 according to the present embodiment enables to slide down the light weight liquid crystal video monitoring equipment 50 to the operating position utilizing the restoring force of the second spring 95 made of a shape-memory alloy and to move up to the storage position utilizing the urging force of the spring 90.

This storage device and storing method require no special driving force for driving the video monitoring equipment 50 up and down, so they can be structured simply and have less trouble. Moreover, they are very safe since the video monitoring equipment 50 moves up in the storage direction when the electrical system happens to fail.

As described above, the storage device of the video monitoring equipment disposed within the airliner moves the video monitoring equipment to a position visible for the passengers at the same time when the operation of the video monitoring equipment is started, and stores the video monitoring equipment at the same time when the operation of the video monitoring equipment is stopped, so it can be manipulated simply. Furthermore, it requires no special driving device for moving the video monitoring equipment, so it is structured simply and has less trouble. Also it requires no device for integrated control and no electrical wiring for the storage device as required in the prior storage device, so it saves space. Still furthermore, it is very safe since, when the electrical system happens to fail, the video monitoring equipment is securely stored and the danger of it stopping while hanging from the ceiling of the airframe or from the storage box is avoided.

The method for storing the video monitoring equipment for an airliner according to the present invention enables to move the video monitoring equipment to the operating position and to the storage position by switching the power source ON/OFF for starting or ending the operation of the video monitoring equipment, so that it is easy to manipulate, requires no driving power for moving the video monitoring equipment, has less trouble and is fit for long period of use. Furthermore, this method is very safe since, when the electrical system happens to fail while operating, the video monitoring equipment is securely moved to a storing position as the operation of the video monitoring equipment is stopped.

I claim:

1. A storage device for an airliner for storing video monitoring equipment and for moving said video monitoring equipment between a position visible to passengers and a storage section of an airframe for storage, comprising:
    a first spring having a first end fixed to the airframe side and a second end fixed to a video monitor between the storage section in a side of the airframe and the video monitoring equipment, said first spring being a long cylindrical spring and being urged in the direction of said airframe side;
    a second spring made of a shape-memory alloy which returns to a specific memorized shape when it is heated, a first end of said second spring being fixed to said airframe side and a second end being fixed to said video monitoring equipment;
    a first means for moving said video monitoring equipment to said visible position by causing said second spring to return to said memorized shape by heating said second spring; and
    a second means for moving said video monitoring equipment to said storage side of said airframe by means of an urging force of said first spring halting said heating of said second spring.

2. A method for storing video monitoring equipment for an airliner, wherein the video monitoring equipment which is set in a position visible to passengers within the airliner is moved to a storage position in a side of an airframe, wherein said video monitoring equipment comprises first and second springs that connect said airframe side and said video monitoring equipment, said first spring being urged in a direction of contraction and said second spring constructed of a shape-memory alloy which has memorized a specific shape when it is heated, comprising the steps of:
    setting said video monitoring equipment in a visible position when said second spring takes said specific shape and setting said video monitoring equipment in said storage position when said first spring contracts;

heating said second spring with electric power fed to said video monitoring equipment, causing said second spring to return to said memorized specific shape to move said video monitoring equipment to said visible position; and stopping the operation of said video monitoring equipment when the power is switched off and moving said video monitoring equipment to said storage position by an urging force of said first spring.

3. A storage device for storing video monitoring equipment for an airliner, comprising:

said video monitoring equipment disposed turnably from a storage position to a visible position through an intermediary mounting shaft for affixing said video monitoring equipment to a storage section of said video monitoring equipment installed in appropriate places of an airframe;

a first spring having a first end fixed to said airframe and having a second end fixed to said video monitoring equipment, wherein said first spring is urged in a direction of contraction;

a second spring having a first end fixed to said airframe and having a second end fixed to said video monitoring equipment, wherein said second spring is made of a shape-memory alloy memorizing a shape in which said second end is turned when it is heated;

wherein said second spring turns to said memorized shape when it is heated to move said video monitoring equipment to said visible position; and wherein said first spring contracts when the heating of said second spring is stopped to move said video monitoring equipment to be stored in said storage section.

4. A storage device for storing video monitoring equipment for an airliner, comprising:

a pair of fixed rails fixed within a storage section of the video monitoring equipment installed in appropriate places of an airframe;

video monitoring equipment on which moving rails are fixed that slide by being guided by said pair of fixed rails;

a first spring disposed between said pair of fixed rails and said video monitoring equipment, having a first end fixed to an upper end of one of said fixed rails and having a second end connected to said video monitoring equipment, wherein said first spring is urged in a direction of contraction;

a second spring made of shape-memory alloy, having a first end fixed to said upper end of one of said fixed rails and having a second end connected to said video monitoring equipment, wherein said second spring memorizes a shape where both first and second ends are opened;

wherein said video monitoring equipment slides to a visible position by being guided by said pair of fixed rails when said second spring returns to said memorized shape where both first and second ends are opened when it is heated; and said video monitoring equipment slides to said storage section by being guided by said pair of fixed rails when the heating of said second spring is stopped and said first spring contracts.

5. A storage device for storing video monitoring equipment for an airliner according to claim 3, wherein said first spring is a long cylindrical spring wherein said first and said second ends are bent in a right angle to each other in the same direction and in the same plane.

6. A storage device for storing video monitoring equipment for an airliner according to claim 3, wherein said second spring has a long cylindrical shape causing martensite transformation, wherein said first and said second ends are bent in a right angle to each other, wherein a first bent portion memorizes a shape in which it is turned 90° in a plane perpendicular to the longitudinal direction of said second spring.

7. A storage device for storing video monitoring equipment for an airliner according to claim 4, wherein said first shape is urged in a direction of contracting both said first and second ends thereof.

8. A storage device for storing video monitoring equipment for an airliner according to claim 4, wherein said second spring has a long cylindrical shape causing martensite transformation and memorizing a shape in which both said first and second ends thereof are opened when heated.

9. A storage device for storing video monitoring equipment for an airliner according to claim 4, wherein said moving rails of said video monitoring equipment are slidably mounted to said pair of fixed rails through an intermediate retainer having bearings.

10. A storage device for storing video monitoring equipment for an airliner according to claim 1, wherein said video monitoring equipment is stored in a ceiling of an airframe.

11. A storage device for storing video monitoring equipment for an airliner according to claim 1, wherein said video monitoring equipment is light in weight and uses liquid crystal.

12. A storage device for storing video monitoring equipment for an airliner according to claim 1, wherein said video monitoring equipment is stored in a casing having a window hole that approximately corresponds to a video screen of said video monitoring equipment.

13. A storage device for storing video monitoring equipment for an airliner according to claim 1, wherein said second spring is connected to a power source used by said video monitoring equipment, and a temperature of said second spring rises due to thermal resistance thereof at the same time when said video monitoring equipment starts to operate.

14. A storage device for storing video monitoring equipment for an airliner according to claim 1, wherein said video monitoring equipment is stored in the storage section in a bottom plate of a storage box.

* * * * *